United States Patent [19]

Seidel

[11] 3,857,106

[45] Dec. 24, 1974

[54] AMPLIFIER WITH N-PORT SIGNAL EXCITATION

[75] Inventor: Harold Seidel, Warren, N.J.

[73] Assignee: Bell Telephone Laboratories Incorporated, Murray Hill, N.J.

[22] Filed: Sept. 4, 1970

[21] Appl. No.: 69,578

[52] U.S. Cl. .................................. 330/53, 330/30 R

[51] Int. Cl. .................................................. H03f 3/60

[58] Field of Search .............. 330/124, 53, 69, 30 R

[56] References Cited

UNITED STATES PATENTS

| | | | |
|---|---|---|---|
| 3,202,927 | 8/1965 | Ishimoto et al. | 330/124 X |
| 3,304,513 | 2/1967 | Offner | 330/69 |
| 3,419,813 | 12/1968 | Kamnitsis | 330/53 X |
| 3,423,688 | 1/1969 | Seidel | 330/53 |
| 3,426,292 | 2/1969 | Seidel | 330/53 X |

*Primary Examiner*—Nathan Kaufman
*Attorney, Agent, or Firm*—S. Sherman

[57] ABSTRACT

The notion that an active element, such as a transistor, has unique input and output ports is abandoned in favor of a less restrictive view which examines "activity" with respect to all ports. More specifically, the eigenstates of an activity matrix which characterizes the active element are defined, and all the ports of the active element simultaneously energized in that state which provides a net gain. The energy scattered from the respective ports is then combined at a common output terminal. Net gain is obtained when the combined output power is greater than the incident power. This gain, however small, is then built up to any specified level by means of an unconditionally stable, positive feedback circuit arrangement. It is an advantage of this approach that the activity defined by the eigenstates is independent of how deeply this activity is embedded within the parasitics of the active element. No special circuitry is required to extract it. In addition, the eigenstates serve as a necessary and sufficient basis to determine the possibility of net gain for any active device.

10 Claims, 7 Drawing Figures

INVENTOR
H. SEIDEL
BY
Lyman Sherman
ATTORNEY

AMPLIFIER WITH N-PORT SIGNAL EXCITATION

This invention relates to amplifiers and oscillators using multiport active elements in which no distinction is made among the ports as to "input" or "output."

BACKGROUND OF THE INVENTION

Traditionally, the active element of an amplifier is viewed as having an input port and an output port, and the amplifier characteristics are defined with respect to these two ports. At the higher frequencies, where the parasitics of the active element tend to degrade amplifier performance, various compensating arrangements, such as neutralization, are employed to minimize these deleterious effects and, thereby, extend the useful range of the amplifier. Such a procedure, however, results in circuit complexities of questionable value.

SUMMARY OF THE INVENTION

The present invention abandons the notion that the active element of an amplifier has unique input and output ports in favor of a less restrictive view which examines "activity" with respect to all ports. More specifically, the eigenstates of an activity matrix, which characterizes the active element, are defined and all of the ports of the active element are then simultaneously energized in that state which provides a net gain. The energy scattered from the respective ports is then combined at a common output terminal. Net gain is obtained when the combined output power is greater than the incident power. This gain, however small, is then built up to any specified level by means of an unconditionally stable, positive feedback circuit arrangement.

It is an advantage of this approach that the activity of the active element, as defined by the eigenstates, is independent of how deeply this activity is embedded within the parasitics of the element. No special circuitry is required to extract it. In addition, the eigenstates serve as a necessary and sufficient basis to determine the possibility of net gain for any active, multiport device.

In a specific illustrative embodiment of the invention using a transistor as the active element, the input signal is divided into two components whose relative amplitudes are defined by the eigenstates of the activity matrix. One signal is applied between the base and emitter electrodes, while the second signal is simultaneously applied between the collector and emitter electrodes. The two scattered signals emitted between the above-specified pairs of electrodes are then combined, in phase, in a common output terminal.

Positive feedback can then be utilized to build up the output signal to any specified level, or to produce oscillations if a signal source, rather than an amplifier, is desired.

Also disclosed is an arrangement for paralleling active elements where larger amounts of power are required. These and other objects and advantages, the nature of the present invention, and its various features, will appear more fully upon consideration of the various illustrative embodiments now to be described in detail in connection with the accompanying drawings.

DETAILED DESCRIPTION

Figures 1, 2:
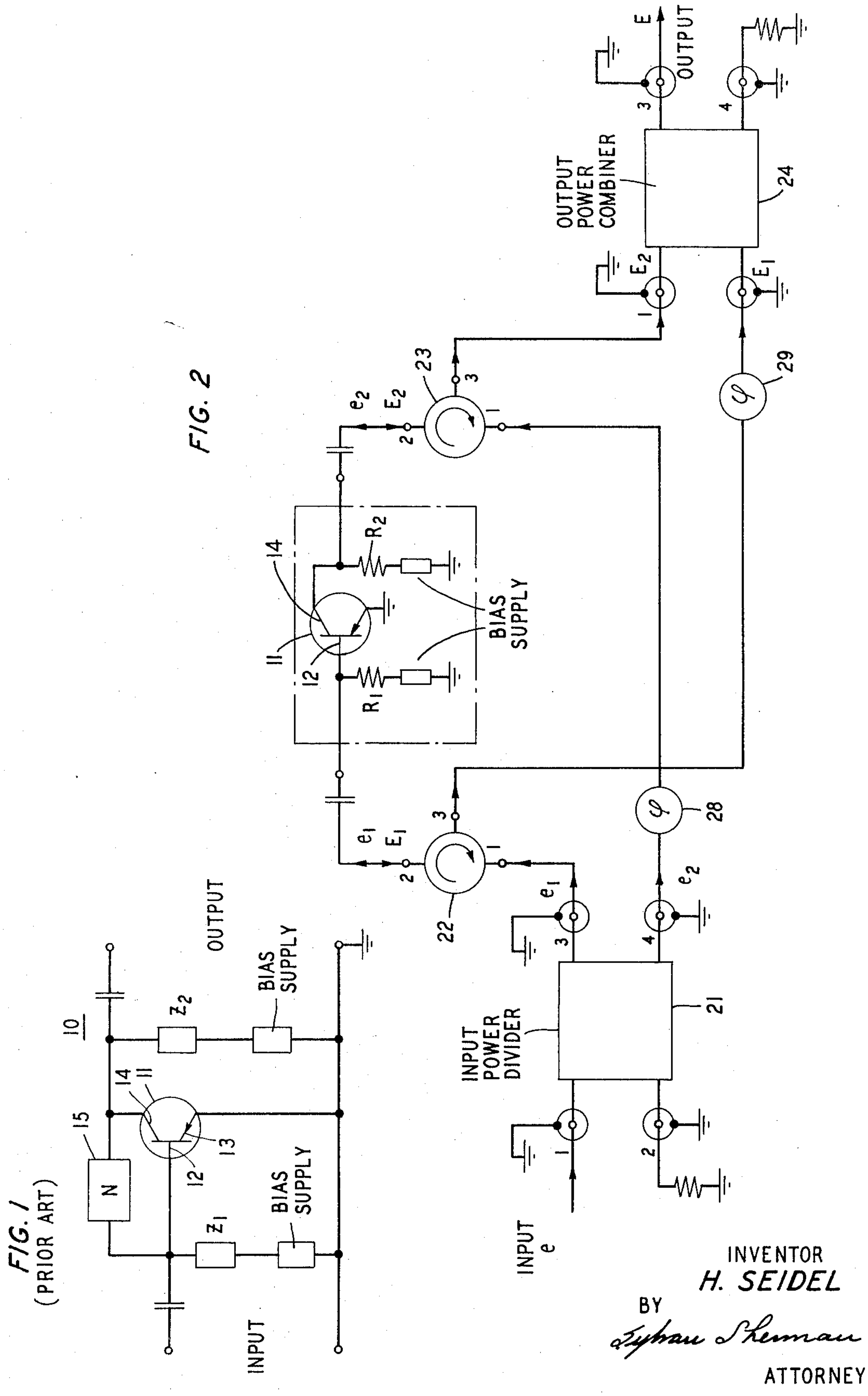
FIG. 1 (PRIOR ART), FIG. 2
FIG. 1, included for purposes of comparison, shows a typical prior art transistor amplifier.
FIG. 2 shows a first embodiment of an amplifier in accordance with the present invention.

Traditionally, an amplifier comprises an active element embedded in a particular network. In general, the amplifier includes an input circuit, to which the input port of the active element is connected, and an output circuit to which the output port of the active element is connected. The amplifier gain is then defined as the ratio of the output power to the input power for the particular network configuration. Thus, referring to the drawings, FIG. 1, included for purposes of comparison, shows a typical prior art amplifier 10, of the type described, comprising a transistor 11, have a base electrode 12, an emitter electrode 13 and a collector electrode 14, connected in the common emitter configuration. In this arrangement, an input circuit $Z_1$ is connected between the base electrode and the common emitter electrode and an output circuit $Z_2$ is connected between the collector electrode and the common emitter electrode. Similarly, the input signal is applied between the base and emitter electrodes, and the output signal is obtained across the collector and emitter electrodes. In this respect, the amplifier of FIG. 1 is typical of all amplifiers in the sense that the active element has a unique "input" port and a unique "output" port.

While this arrangement is quite satisfactory at the lower frequencies, it is known that as the frequency of operation is raised parasitic impedances associated with the active element tend to degrade the performance of the amplifier. This can manifest itself by a reduction in gain or by an instability in the amplifier induced by multiple reflections between the transistor and the external load impedances $Z_1$ and $Z_2$, and by spurious internal couplings between the input and output electrodes. In accordance with the prior art, these difficulties are typically offset by various arrangements which attempt to tune out the parasitics. One such arrangement utilizes a neutralization circuit 15, represented by the block connected between collector electrode 14 and base electrode 12. For a more detailed discussion of this technique, see the article by S. J. Mason, entitled "Power Gain in Feedback Amplifier," published in Transactions of the I.R.E. Professional Group on Circuit Theory, 1954, pp. 20–25.

The present invention avoids the complications inherent in this type of an approach by abandoning the notion that an active element has unique input and output ports in favor of a less restrictive view which examines "activity" with respect to all ports. In addition, the opportunities for instabilities to develop are totally avoided by eliminating input and output circuits $Z_1$ and $Z_2$, (which, typically, are high impedance, reactive circuits), and embedding the active element in a totally reflectionless environment. Thus, using the same transistor 11 as the active element, FIG. 2 shows an amplifier in accordance with the present invention comprising: an input power divider 21; a pair of circulators 22 and 23; active element 11; and an output power combiner 24. Resistors $R_1$ and $R_2$, connected to base electrode 12 and collector electrode 14, respectively, are included as part of the bias circuits for the transistor and are to be distinguished from impedances $Z_1$ and $Z_2$ of FIG. 1 which, as noted above, are typically high Q, tuned circuits. Also included in FIG. 2 are phase shifters 28 and 29 for reasons which will be explained more fully hereinbelow.

In operation, the signal $e$ to be amplified is applied to port 1 of input signal divider 21. The latter, which can be any of the many well-known and commonly used reactive four-ports, such as, for example, a quadrature hybrid coupler, divides the input signal into two, generally unequal, components $e_1$ and $e_2$. Component $e_1$ is, in turn, coupled through circulator 22 to the base of transistor 11, while signal component $e_2$ is coupled by means of phase shifter 28 and circulator 23 to the collector electrode.

Simultaneously excited at both ports, a pair of scattered waves $E_1$ and $E_2$ are produced. The scattered waves have definitely defined relative amplitude and phase relationships which are determined by the scattering matrix of the transistor two-port, and the relative amplitude and phase relationships of the input signal components $e_1$ and $e_2$. As such, they can be combined in power combiner 24 which, advantageously, is a reactive four-port tailored precisely to those relationships. to produce a single output signal E which includes all of the energy contained in $E_1$ and $E_2$. Accordingly, signals $E_1$ and $E_2$ are coupled by way of circulators 22 and 23, respectively, and phase shifter 29, to the input ports of output power combiner 24 wherein they combine in output port 3 of the latter.

A net power gain is obtained when the scattered waves $E_1$ and $E_2$ contain more power than the incident waves $e_1$ and $e_2$. Since it is evident that the incident waves can assume an infinite variety of relative signal amplitudes and phases, the necessary and sufficient conditions for gain will now be defined.

In general, for any $n$-port, the input signals and the output signals are related by a scattering matrix S. Since transistor 11 is connected as a two-port, the following discussion will be limited to two-ports. However, it is understood that the procedure to be outlined hereinbelow is equally applicable to any multiport network.

Indicating the two input signals $e_1$ and $e_2$, and the two output signals $E_1$ and $E_2$ by the vectors $e$ and $E$, respectively, where $$e=\begin{vmatrix} e_1 \\ e_2 \end{vmatrix},$$

and $$E=\begin{vmatrix} E_1 \\ E_2 \end{vmatrix}$$

the relation between input and output is given by $$E = Se \qquad (1)$$

The input power $P_i$ is given by $$P_i = \bar{e}e \qquad (2)$$

and the output power $P_o$ is given by $$P_o = \bar{E}E \qquad (3)$$

where $\bar{e}$ and $\bar{E}$ are the conjugate transpose of $e$ and $E$, *respectively*.

Substituting equation (1) in (3), we obtain $$\bar{E}E = (\bar{S}\bar{e})(Se). \qquad (4)$$

Noting that $\bar{S}\bar{e} = \bar{e}\bar{S}$, equation (4) can be rewritten $$\bar{E}E = \bar{e}\bar{S}Se. \qquad (5)$$

The net power generated, $P$, given by the difference between the output power and the applied power, is then $$P = P_o - P_i. \qquad (6)$$

In terms of the applied signal, $$P = \bar{e}\,[\bar{S}S - 1]\,e. \qquad (7)$$

The term $[\bar{S}S - 1]$, which characterizes the active element, is defined as the "activity matrix" $A$. Rewriting equation (7) in terms of $A$, the net power generated is given by $$P = \bar{e}Ae. \qquad (8)$$

It can be shown that equation (8) is greater than zero for at least some vectors, $e$, if the activity matrix A has at least one positive eigenvalue. In particular, the specific vectors $e$ sought, the so-called eigenstates, are these modes of excitation that are consistent with the natural modes of the system, as defined by the activity matrix A. More specifically, they are the modes of excitation which, when operated upon by operator A, result solely in a scalar modification λ of the eigenstates. Expressed mathematically, the eigenvalue λ of operation A for eigenstate $e_\lambda$ is defined as $$Ae_\lambda = \lambda e_\lambda\ . \qquad (9)$$

Since the particular illustrative example is a two-port, there are two eigenvalues $\lambda_1$ and $\lambda_2$ which are obtained by solving the quadradic equation $$(A_{11}-\lambda)(A_{22}-\lambda) - A_{12}A_{21} = 0 \qquad (10)$$

where $A_{11}$, $A_{12}$, $A_{21}$ and $A_{22}$ are the matrix elements of activity matrix $$A=\begin{vmatrix} A_{11}A_{12} \\ A_{21}A_{22} \end{vmatrix}. \qquad (11)$$

The relative amplitudes and phases of the excitation signals $e_1$ and $e_2$ are then determined from $$e_1/e_2 = -(A_{11}-\lambda)/A_{12}. \quad (12)$$

So long as either $\lambda_1$ or $\lambda_2$, obtained from the solution of equation (10), is positive, the output signal power will be greater than the input signal power, resulting in a net power gain for the amplifier. If both eigenvalues are positive, the mode of excitation defined by equation (12) for the larger value will produce the greater gain. However, the larger eigenvalue might possibly produce a narrower bandwidth amplifier. Accordingly, if this is so, the smaller eigenvalue may be preferred even though it results in less gain.

Referring again to equation (8), the net power $P$ generated for excitation $e_\lambda$ is $$P_\lambda = \bar{e}_\lambda \; Ae_\lambda \; . \quad (13)$$

Substituting from equation (9) in equation (13) we obtain $$P_\lambda = \bar{e}_\lambda \; \lambda e_\lambda \; . \quad (14)$$

Since $\lambda$ is a scalar, equation (14) can be rewritten as $$P_\lambda = \lambda(\bar{e}_\lambda \; e_\lambda \;). \quad (15)$$

For unit excitation power, $(\bar{e}_\lambda \; e) = 1$, equation (15) reduces to $$P_\lambda = \lambda. \quad (16)$$

That is, the normalized net power generated is equal to the eigenvalue.

The power gain, $G$, equal to the ratio of output power to input power, is then $$G = \lambda + 1. \quad (17)$$

Example

The following illustrative example utilizes the scattering parameters for a type 2N 3570 transistor.

Operating in the common emitter mode at 750 Mhz:

$S_{11} = 0.277 \;\angle -59.0°$
$S_{12} = 0.078 \;\angle 93.0°$
$S_{21} = 1.920 \;\angle 64.0°$
$S_{22} = 0.848 \;\angle -31.0°$ Solving for the input and output signals, we obtain:

$e_1 = 0.9176 \;\angle 0°$
$e_2 = 0.3975 \;\angle 95.7°$
$E_1 = 0.2441 \;\angle 0°$ and
$E_2 = 2.0989 \;\angle 129.9°$, for a power gain of 6.498 db.

Applying the above values to the embodiment of FIG. 2, input coupler 21 would be designed to divide the input signal into two components having the ratio $$e_1/e_2 = 0.9176/\mathbf{0.3975}.$$

Using a quadrature coupler for this purpose, the latter is designed to have a coefficient of transmission $t_1 = 0.9176$ and a coefficient of coupling $k_1 = 0.3975$. Since, in a quadrature coupler, the coupled component $e_2$ has a 90° phase shift relative to component $e_1$, phase shifter 28 is designed to introduce the additional 5.7° called for in the solution.

Similarly, to combine the scattered signal components the coefficient of transmission $t_2$ and the coefficient of coupling $k_2$ of the output power combiner are in the ratio $$t_2/k_2 = 2.0989/\mathbf{0.2441}.$$

If a quadrature coupler is used as the power combiner, phase shifter 29 is designed to introduce a phase shift of 129.9°–90° to the $E_1$ component so that the latter leads the $E_2$ component by 90°. So phased, all of the power in the scattered wave components $E_1$ and $E_2$ will combine in output port 3 of power combiner 24.

In a design theory paper entitled "Quick Amplifier Design With Scattering Parameters," by W. H. Froehner, published in the Oct. 16, 1967 issue of *Electronics*, an amplifier is described using the same transistor in the conventional manner. In particular, the author defines the input and output circuits to produce a maximum gain of 12.8 decibels, which is considerably greater than the 6.498 decibels of gain calculated for the amplifier designed in accordance with the present invention. An understanding of reason for this difference in gain, which will now be explained, is basic to an understanding of the difference in the two design philosophies employed.

As indicated hereinabove, a signal incident at a port of an active element produces a scattered wave which propagates away from the excited port. In the typical prior art amplifier, a portion of the scattered wave produced by the input signal is reflected by the input circuit connected thereto, and redirected back to the input port. This reflected wave, in turn, produces a second scattered wave and the process is repeated and rerepeated. In effect, the input signal makes a plurality of passes at the active element. In a properly designed amplifier, this multiple excitation is cumulative, and shows up in the gain of the amplifier. The better the design, the greater the gain. Indeed, for the amplifier described in the above-described article, the calculated maximum gain is 12.8 decibels, which obviously is considerably greater than the 6.498 decibels calculated for the amplifier designed in accordance with the present invention. This difference is due to the fact that in applicant's amplifier the scattered waves propagate away from the active element into a matched load and, hence, no portions of these waves are ever reflected back to the active element. Thus, in applicant's amplifier the input signal makes only one pass at the active element, producing a correspondingly lower initial gain. (Added gain, if required, is obtained by means of a positive feedback arrangement, as will be described hereinbelow.) On the other hand, the advantages of applicant's arrangement reside first in the greater simplicity of the amplifier, there being no need to design and then build particular input and output circuits and neutralization networks. Secondly, an amplifier in accordance with the invention is unconditionally stable at all frequencies. By contrast, a prior art amplifier, though carefully designed to be stable over some specific frequency range, may readily be unstable out of band. Indeed, a substantial portion of the above-identified article is devoted to the stability problem.

Figures 3, 4:
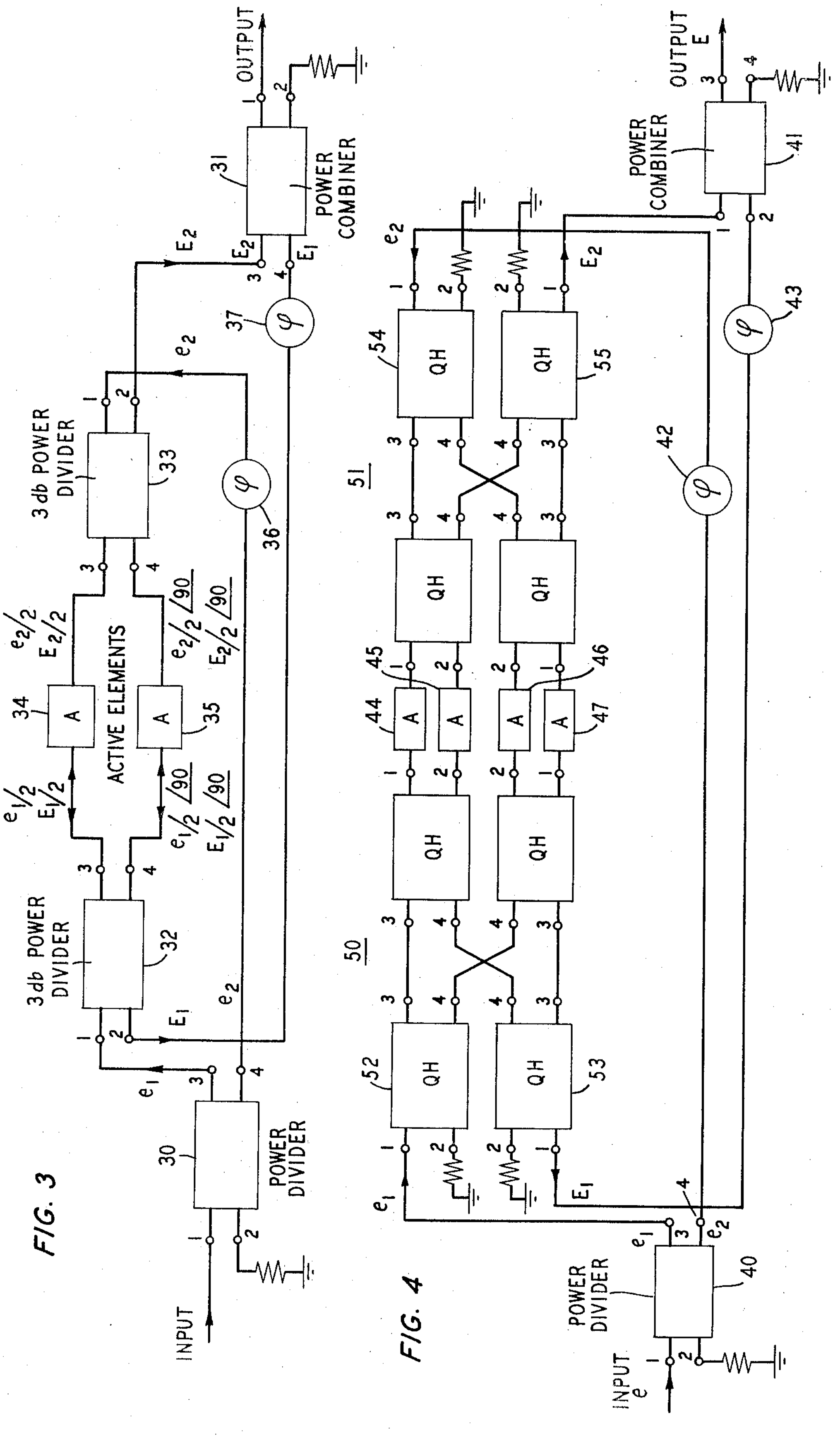
FIG. 3 shows an alternate embodiment of the invention employing two active elements.
FIG. 4 shows an embodiment of the invention employing four active elements.

Referring again to the drawings, FIG. 3 shows an alternate embodiment of the invention. As indicated hereinabove, a principal advantage of the present invention is its stability, which derives from the fact that the active element is embedded in a totally reflectionless network. That is, none of the energy associated with scattered waves $E_1$ and $E_2$ is reflected back to the active element by the embedding network. However, in the particular illustrative embodiment of FIG. 2 there is the possibility that out of the band of interest some energy may be reflected by circulators 22 and 23. The latter, which can be any of the many known three or four-port circulators, can be designed to have a good impedance match, but only over a limited band. Thus, there may be a mismatch at an out-of-band frequency for which the active element exhibits significant activity. To avoid even this remote possibility, the circulators are advantageously replaced by two 3 db power dividers, such as quadrature hybrid couplers, which are known to maintain a constant impedance over an extended frequency range. Such an alternative embodiment, illustrated in FIG. 3, comprises input power divider 30; an output power combiner 31; two active elements 34 and 35; and phase shifters 36 and 37. Unlike the embodiment of FIG. 2, however, the circulators are replaced by two 3 db power dividers 32 and 33.

As in the embodiment of FIG. 2, the input signal is divided into two components $e_1$ and $e_2$, by means of power divider 30, in accordance with the eigenstates defined by the activity matrix of elements 34 and 35. The required phase shift is obtained by means of phase shifter 36. Each of the components $e_1$ and $e_2$ is then applied to one of the 3 db power dividers 32 or 33 wherein each is further divided into two pairs of components having equal amplitudes $|e_1/\sqrt{2}|$ and $|e_2/\sqrt{2}|$. The latter are then coupled, respectively, to the two ports of the two active elements. It will be noted that the relative phase of the input signal components are preserved by the second division process and, hence, each active element is excited in the same eigenstate. For example, using quadrature couplers, signal component $e_1$, incident at port 1 of coupler 32, is divided into two components $e_1/\sqrt{2}$ and $e_1/\sqrt{2}\angle 90$. Similarly, component $e_2$, incident at port 1 of coupler 33, is divided into two components $e_2/\sqrt{2}$ and $e_2/\sqrt{2}\angle 90$. Thus, components $e_1/\sqrt{2}$ and $e_2/\sqrt{2}$ applied to active element 34, and components $e_1/\sqrt{2}\angle 90$ and $e_2/\sqrt{2}\angle 90$ applied to active element 35 have the same relative amplitudes and the same relative phases as components $e_1$ and $e_2$.

Similarly, the scattered waves $E_1/\sqrt{2}$ and $E_1/\sqrt{2}\angle 90$ from active element 34, and $E_2/\sqrt{2}$ and $E_2/\sqrt{2}\angle 90$ from active element 35 have the appropriate amplitudes and phases to combine in port 2 of power dividers 32 and 33. The resulting signals $E_1$ and $E_2$ are then further combined in output port 1 of power combiner 31 to form the outside signal $E$. The necessary phase relationship for this second combination is established by phase shifter 37.

It will be noted, in connection with this embodiment of the invention, that two active elements are employed, and that the bare elements are embedded in a common network. This is in clear contrast to the prior art which carefully embeds each active element in its own separate network prior to paralleling them. In addition, it will be further noted that not only is it a relatively simple matter to parallel active elements so as to obtain more output power, but that the use of two elements results in improved performance.

If greater output power is required, additional active elements can be parallel by means of the arrangement shown in FIG. 4. As in the previously described circuits, the input signal in the embodiment of FIG. 4 is divided into two components $e_1$ and $e_2$ by means of an input power divider 40, and the two scattered waves $E_1$ and $E_2$ are combined in an output power combiner 41. The excitation phase of the incident signals and the phase of the scattered signals are adjusted by means of phase shifters 42 and 43, respectively.

Each of the signal components $e_1$ and $e_2$ is applied to a power divider network 50 and 51 which divides the respective components into $2^n$ equal parts $e_1/(\sqrt{2})^n$ and $e_2/(\sqrt{2})^n$, where $2^n$ is the number of active elements. The power divider can be an $n$ by $2^{n-1}$ fan-out array of quadrature couplers, arranged in the manner described in my copending application Ser. No. 768,708, filed Oct. 18, 1968, and assigned to applicant's assignee. In such an array the hybrids are arranged in $n$ levels of binary division to form $2^n$ output branches. Each of the output ports of each hybrid in each of the first $n-1$ levels of binary division is connected to an input port of a different hybrid in the next level of binary division such that each input port of the fan-out connects to each output branch through only one wavepath.

For purposes of illustration, a four-branch fan-out array is illustrated in FIG. 4. It is a property of such an array that when signal $e_1$ is applied to port 1 of hybrid 52, all of the wave energy scattered by the four active elements 44, 45, 46 and 47, combines in port 1 of coupler 53. Similarly, signal component $e_2$ applied at port 1 of coupler 54 results in a scattered wave $E_2$ at port 1 of coupler 55. Wave components $E_1$ and $E_2$ are then combined in power combiner 41 to produce the output signal $E$.

While the embodiment of FIG. 4 uses four active elements, it is understood that by enlarging the fan-out, fan-in arrays 50 and 51, any number $2^n$ of active elements can be paralleled to produce any required level of output power.

As indicated hereinabove, an amplifier in accordance with the present invention is unconditionally stable over the entire frequency spectrum. It is, accordingly, a readily simple matter to increase the overall gain of the amplifier by the application of positive feedback, as illustrated in FIG. 5.

Figures 5, 6:
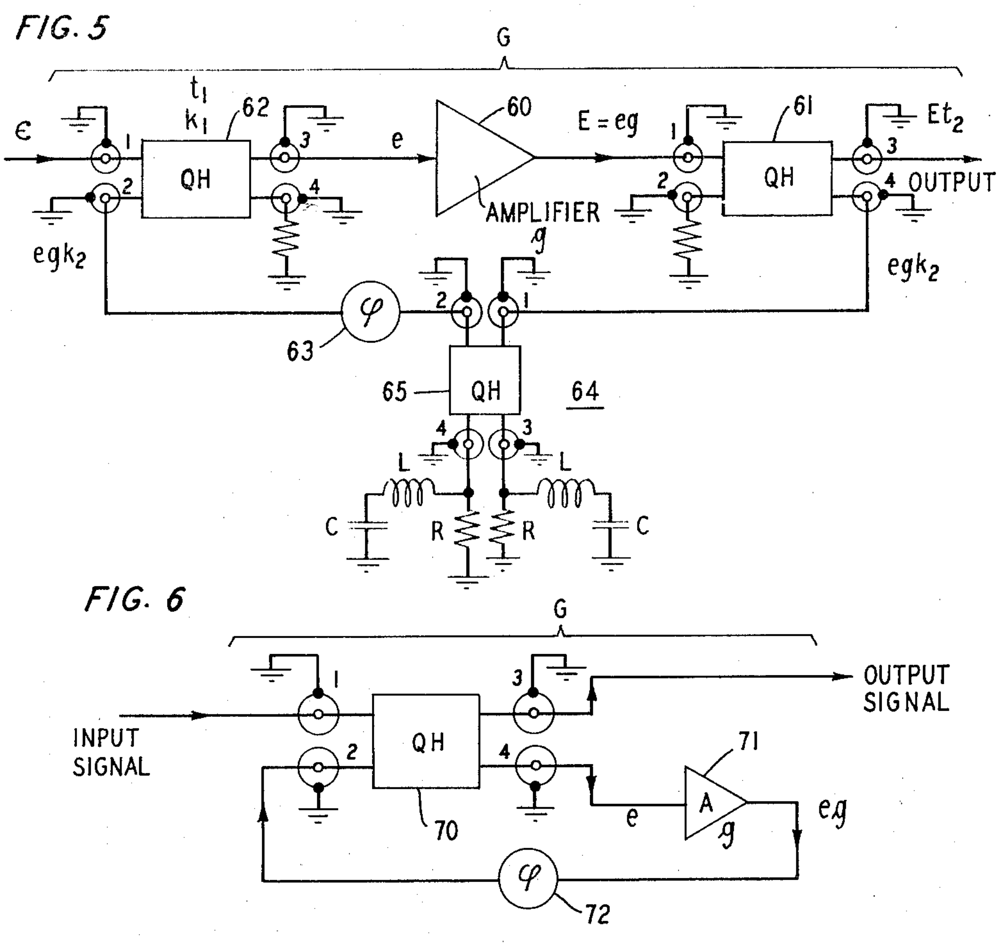
FIGS. 5 and 6 show the application of positive feedback to the amplifiers of FIGS. 2, 3 and 4.

In the embodiment of the invention illustrated in FIG. 5, amplifier 60 is any one of the amplifiers illustrated in FIGS. 2, 3 or 4 having an input signal $e$ and an output signal $E$, for a voltage gain $g = E/e$. To obtain a greater overall gain $G>g$, a portion of the output signal $E$ is coupled back to the input end of the amplifier by means of a first quadrature hybrid coupler 61, located in the amplifier output circuit, a phase shifter 63, and a quadrature coupler 62, located at the input end of amplifier 60. A filter 64 is optionally included in the feedback circuit to further insure out-of-band stability.

In operation, the output signal $E = eg$ is coupled to port 1 of coupler 61. Most of this signal is transmitted through the coupler as the amplifier output $Et_2$. A small portion, $egk_2$, however, is coupled to port 4 of coupler 61, where $t_2$ and $k_2$ are the transmission and coupling coefficients of the coupler such that $$|k_2|^2 + |t_2|^2 = 1. \tag{18}$$

Port 2 of coupler 61 is match-terminated.

The phase of the fed back signal $egk_2$ is adjusted by phase shifter 63 such that when it is coupled to port 2 of coupler 62, and input signal $\epsilon$ is coupled to port 1 of coupler 62, all of the incident power emerges at port 3 and none is coupled to match-terminate port 4. That is $$|\epsilon|^2 + |egk_2|^2 = |e|^2. \tag{19}$$

The overall amplifier gain $G$, equal to the ratio of output signal to the input signal, is then given by $$G = |egt_2/\epsilon|. \tag{20}$$

Solving equations (18), (19) and (20) we obtain $$|k_2|^2 = \frac{\frac{G^2}{g^2} - 1}{G^2 - 1} \tag{21}$$

and $$|t_2|^2 = 1 - |k_2|^2, \tag{22}$$

which fully defines coupler 61.

The parameters of coupler 62 are determined by noting that $$|\epsilon| = |et_1|, \tag{23}$$

which, where substituted in equation (20), yields $$|t_1| = |(g/G)\ t_2|. \tag{24}$$

Similarly, noting that $$|ek_1| = |egk_2|, \tag{25}$$

we derive $$|k_1| = |gk_2|. \tag{26}$$

Equations (24) and (26) fuly define coupler 62.

As indicated above, a filter can be included in the feedback path, if required, to insure out-of-band stability. The function of the filter is to provide a matched, low-loss transfer function over the band of interest, and a matched, high insertion loss out of the band of interest. While such a filter can assume a variety of forms, an effective and simple filter can be made with a quadrature coupler, as illustrated in FIG. 5. The coupler 65, which has two pairs of conjugate ports 1–2 and 3–4, is connected such that the feedback signal is coupled to port 1. Port 2 connects through phase shifter 63 to port 2 of coupler 62. Identical circuits, comprising a terminating resistor R, and a shunt connected series L–C circuit, tuned to the frequency of interest, are connected to ports 3 and 4.

Within the band of interest, the L–C circuits are a low impedance across the resistors. Hence, signals within the band, applied to port 1 of the filter, are reflected at ports 3 and 4 and recombine in port 2. Out of band, however, the L–C circuits are a high impedance compared to R, causing out-of-band signals to be absorbed in the resistors, and effectively open-circuiting the feedback path.

The amplifier of FIG. 5 converts to an oscillator when the overall gain $G \to \infty$. Making this substitution in (21), we derive the coupler 61 that $$k_2 = 1/g, \tag{27}$$

and, hence, $$t_2 = \sqrt{1 - (1/g^2)}. \tag{28}$$

From equations (24) and (26), we then find that $$k_1 = 1, \tag{29}$$

and $$t_1 = 0. \tag{30}$$

Equations (29) and (30) merely note that since there is no input signal to an oscillator, i.e., $\epsilon = 0$, the feedback path can be directly connected to the input of amplifier 60, and coupler 62 omitted.

FIG. 6 shows a second embodiment of an amplifier with positive feedback employing only one hybrid coupler 70. Designating ports 1–2 and 3–4 as the two pairs of conjugate ports of coupler 70, the input signal is coupled to port 1 and the output of amplifier 71 is coupled to port 2 through a phase shifter 72. Port 4 is connected to the input end of amplifier 71, while the output signal is obtained at port 3.

As in the embodiment of FIG. 5, amplifier 71 can be any one of the amplifiers illustrated in FIGS. 2, 3 or 4, or variations thereof. Designating the overall amplifier gain with feedback as G, the coupler parameters are $$|k|^2 = (G^2-1)\ (g^2-1)\ /(Gg+1)^2 \tag{31}$$

and $$|t|^2 = 1 - |k|^2. \tag{32}$$

A phase shifter is included in the feedback wavepath to provide the proper phase for positive feedback.

Figure 7:
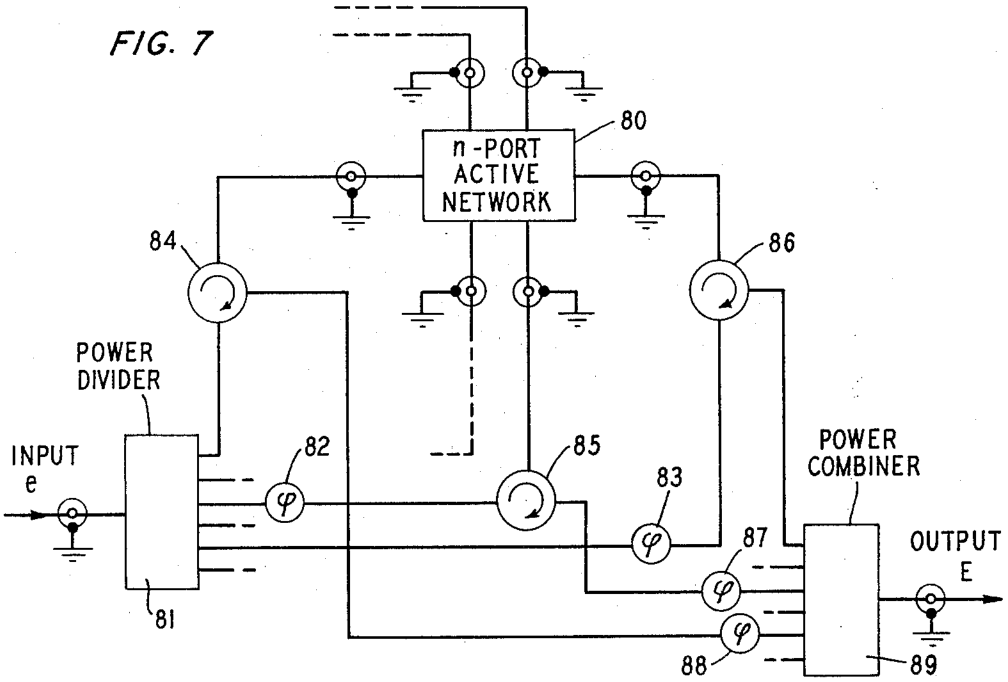
FIG. 7 shows a generalized n-port embodiment of the invention.

In the discussion hereinabove, the transistor was treated as a two-port device. That is, signals were applied between pairs of electrodes, such as between base and emitter, and between collector and emitter. However, there is no reason why, as described in an article by G. E. Bodway entitled "Circuit Design and Characterization of Transistors by Means of Three-Port Scattering Parameter," published in the May 1968 issue of *Microwave Journal*, all three of the transistor electrodes cannot be floating, and signals applied to, and extracted from each of them independently. In this latter situation, the input and output vectors $e$ and $E$ would be given by $$e = \begin{vmatrix} e_1 \\ e_2 \\ e_3 \end{vmatrix}$$

$$E = \begin{vmatrix} E_1 \\ E_2 \\ E_3 \end{vmatrix},$$

and the scattering matrix S and the activity matrix A would both be 3 by 3 matrices. In all other respects, the amplifier design procedure outlined hereinabove would be similar. More generally, the active element can be a more complex $n$-port active network comprising a plurality of active elements, as illustrated in the generalized block diagram of FIG. 7. As shown, an active network, having any arbitrarily complex internal circuit configuration, is excited at each of its $n$ ports by means of signal components derived from a power divider 81. The latter divides the input signal $e$ into $n$ signals in accordance with the eigenvalues defined by the activity matrix of the $n$-port active network. The appropriate phases of the input signal components and the scattered waves are set by phase shifters 82 and 83, and phase shifters 87 and 88, respectively. The scattered waves are collected in power combiner 89 to produce the output signal $E$. Circulators 84, 85 and 86 are used to separate the input and scattered waves. However, as explained hereinabove, reactive four-ports can alternatively be used for this purpose. In addition, two or more active networks can be paralleled for greater output power. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. An amplifier comprising:

an n-port active network, where $n$ is an integer greater than one;

means for dividing an input signal into $n$ components and for coupling each of said components to a different one of said $n$ ports;

and means for coupling all of the energy scattered from said $n$ ports to a common output terminal.

2. The amplifier according to claim 1 wherein said active element is a transistor;

and wherein $n = 2$.

3. The amplifier according to claim 1 wherein said input signal is divided into $n$ components, as defined by the eigenstate of said network.

4. The amplifier according to claim 1 wherein said signal dividing means and said coupling means comprise quadrature hybrid couplers.

5. The amplifier according to claim 1 including a plurality of active networks arranged in parallel;

wherein each is separately energized;

and wherein the energy emitted by each of said networks is combined with the energy emitted by the other of said networks in a common output terminal.

6. The amplifier according to claim 1 including a positive feedback network for increasing the overall gain of said amplifier.

7. The combination according to claim 6 wherein said feedback network includes a hybrid coupler having two pair of conjugate branches; and wherein:

an input signal is coupled to one branch of one pair of conjugate branches;

the common output terminal of said amplifier is coupled to the other branch of said one pair of branches;

the input signal to said amplifier is derived from one branch of said other pair of conjugate branches;

and the output signal is derived from the other branch of said other pair of conjugate branches.

8. An amplifier comprising:

an active network having $n$ ports, where $n$ is an integer greater than one;

reactive means for dividing an input signal into $n$ components, as defined by an eigenstate of said network, and for coupling each of said signal components to a different one of said $n$ ports;

and reactive means for coupling the signals scattered from said $n$ ports to a common output terminal in time phase.

9. An amplifier comprising:

an active network having two ports;

a first hybrid coupler for dividing an input signal into two signal components;

means, including first and second multibranch circulators, for coupling each of said signal components between said first coupler and a different one of said network ports, where each signal component is coupled between a first and a second of said circulator branches;

said circulators further serving to couple signal energy scattered from said two network ports between the second branch and a third branch of said respective circulators;

and a second hybrid coupler coupled to the third branches of said circulators for combining said scattered signal energy at a common output terminal.

10. An amplifier comprising:

a plurality of $n$ active elements, each of which has two ports;

means for dividing an input signal into two signal portions;

means for coupling each of said two signal portions to an input port of a first and a second multibranch power dividing network, respectively, wherein each signal portion is further divided into a plurality of $n$ signal components distributed among $n$ branches of each of said networks;

means for coupling the $n$ branches of each of said networks to a different port of said active elements;

each of said networks further serving to couple signal energy scattered from said active element ports to a network output port different than said input port;

and means, coupled to the output port of each of said networks, for combining said scattered signal energy at a common amplifier output terminal.

* * * * *